United States Patent [19]
Yamaura et al.

[11] Patent Number: 5,301,338
[45] Date of Patent: Apr. 5, 1994

[54] SYSTEM INCLUDING CENTRAL PROCESSING UNIT

[75] Inventors: Shinichi Yamaura, Takarazuka; Takashi Yasui, Toyonaka; Keiichi Yoshioka, Sanda, all of Japan

[73] Assignee: Ricoh Company, Ltd., Tokyo, Japan

[21] Appl. No.: 568,827

[22] Filed: Aug. 17, 1990

[30] Foreign Application Priority Data

Aug. 23, 1989 [JP] Japan .................................. 1-217130

[51] Int. Cl.$^5$ .............................................. G06F 12/04
[52] U.S. Cl. ................................. 395/800; 395/250; 395/550; 364/240; 364/240.3; 364/DIG. 1; 364/DIG. 2
[58] Field of Search ............... 395/800, 200, 250, 550; 364/DIG. 1, DIG. 2

[56] References Cited

U.S. PATENT DOCUMENTS

| | | | |
|---|---|---|---|
| 3,962,684 | 6/1976 | Caudel et al. | 395/325 |
| 3,978,456 | 8/1976 | Moran | 340/172.5 |
| 4,402,042 | 8/1983 | Guttag | 395/550 |
| 4,449,184 | 5/1984 | Pohlman, III et al. | 395/250 |
| 4,514,825 | 4/1985 | Nording et al. | 379/98 |
| 4,694,391 | 9/1987 | Guttag et al. | 395/800 |
| 4,761,755 | 8/1988 | Ardini, Jr. et al. | 364/749 |
| 5,001,664 | 3/1991 | Makita et al. | 364/761 |
| 5,155,843 | 10/1992 | Stamm et al. | 395/575 |

OTHER PUBLICATIONS

Mick, John R., et al., Microprogramming A Bipolar Microprocessor, *Advanced Micro Devices Microprogramming Handbook*, 1976, pp. 1-1 through 1-15.

*Primary Examiner*—Alyssa H. Bowler
*Assistant Examiner*—Deung C. Nguyen
*Attorney, Agent, or Firm*—Cooper & Dunham

[57] ABSTRACT

A central processing unit includes a programmable logic array, a timing control unit, a predecoder, a data input/output part, and a processing part. The processing part carries out a predetermined operation on m-bit low-order data from among data which is composed of n bits and which is read out from a memory and m-bit high-order data from among the data composed of n bits, and outputs a carry signal when the predetermined operation on the m-bit low-order data results in a carry. When the operation code is a read modify write instruction and when the processing part outputs the carry signal, the programmable logic array controls the input/output part so that only the result of the predetermined operation on the m-bit low-order data is written into the memory.

4 Claims, 10 Drawing Sheets

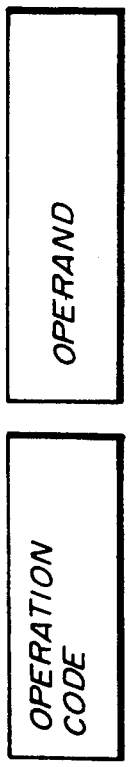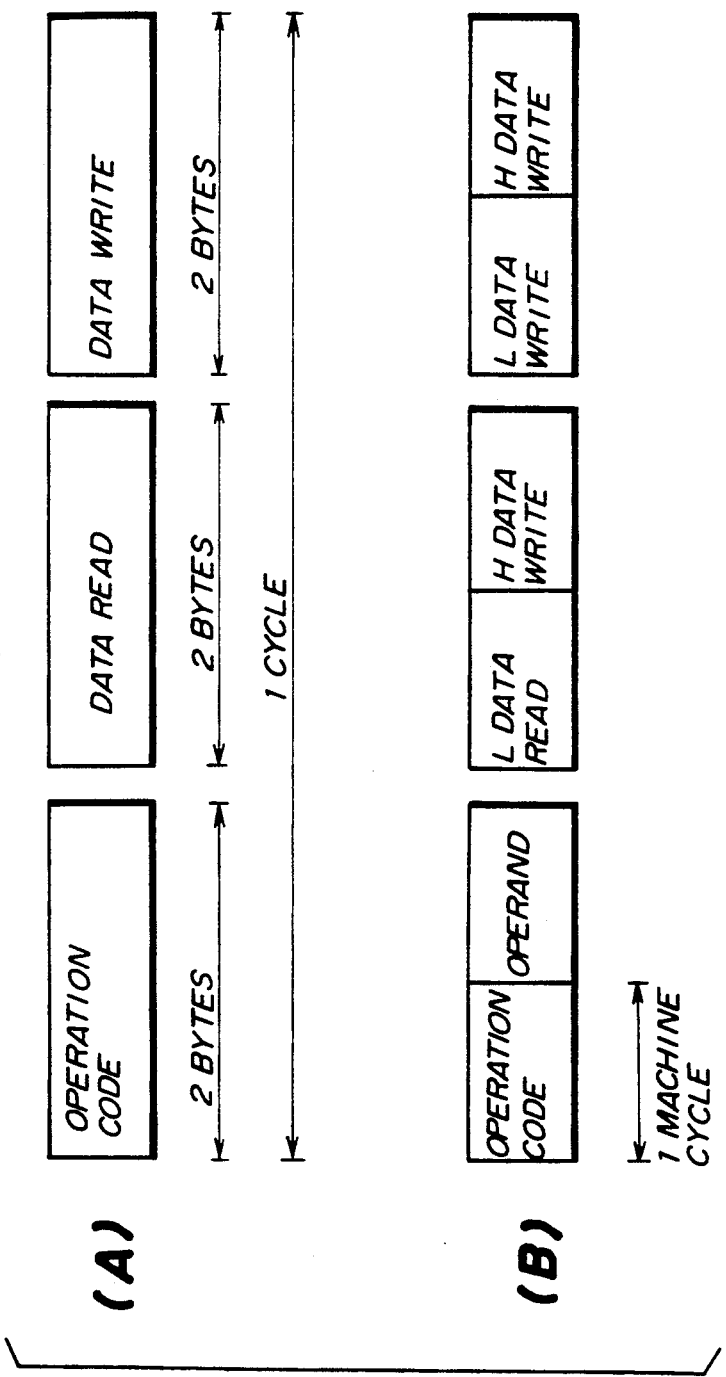

FIG.9

| ADDRESS | DATA | CYCLE | DIL | DOL FROM | MB DRIV | DB DRIV | ALU C-IN | ALU IC | ADL | ADH | TR | AB DRIV | AB DATA |
|---|---|---|---|---|---|---|---|---|---|---|---|---|---|
|  |  |  |  |  |  | DATA |  |  |  |  |  | CAL | PC |
| PC | OP CODE | OF | OP CODE |  |  |  |  |  |  |  |  | PC | PC |
|  |  | OS |  |  |  |  |  |  |  |  |  | CAL | PC+1 |
| PC+1 | OPERAND 12H | 1F | 12H |  |  |  |  |  |  |  |  | AD | EA |
|  |  | 1S |  |  | 00 | DIL |  |  | 12 | 00 | 00 | CAL | EA |
| EA 000012H | RDL | 6F | DL |  |  | 12 |  |  |  |  |  | AD | EA |
|  |  | 6S |  |  | DIL | DL | SUM | 0 | 01 |  |  | CAL | EA+1 |
| EA+1 000013H | RDH | DF | DH | MB | DL+1 RLT | DL+1 |  |  |  |  |  | AD | EA |
|  |  | DS |  |  | DIL | DH | SUM | AC | 00 |  |  | CAL | EA |
| EA 000012H | WDL | EF | DL+1 |  |  |  |  |  |  |  |  | AD | EA+1 |
|  |  | ES |  |  |  |  |  |  |  |  |  | CAL | EA+1 |
| EA+1 000013H | WDH | FF | DH+C | MB | DH+C RLT | DM C |  |  |  |  |  | PC | PC+1 |
|  |  | FS |  |  |  |  |  |  |  |  |  | PC | PC+1 |
| PC+2 | NEXT OP | OF |  |  |  |  |  |  |  |  |  | CAL | PC+2 |
|  |  | OS |  |  |  |  |  |  |  |  |  |  |  |

IF A=0 GO TO CYCLE A

FIG. 10

| ADDRESS | DATA | CYCLE | DIL | DOL FROM | MB DRIV | MB DATA | DB DRIV | DB DATA | ALU C-IN | ALU IC | ADL | ADH | TR | AB DRIV | AB DATA |
|---|---|---|---|---|---|---|---|---|---|---|---|---|---|---|---|
| PC | OP CODE | OF | OP CODE | | | | | | | | | | | CAL | PC |
| | | OS | | | | | | | | | | | | PC | PC |
| PC+1 | OPERAND 12H | 1F | 12H | | | 00 | DIL | 12 | | | 12 | 00 | 00 | CAL | PC+1 |
| | | 1S | | | | | | | | | | | | AD | EA |
| EA 000012H | RDL | 6F | DL | | | | DIL | DL | SUM | 0 | | | | CAL | EA |
| | | 6S | | | | | | | | | | | | AD | EA |
| EA+1 000013H | RDH | DF | DH | MB DL+1 | RLT | DL+1 | DIL | DH | SUM | AC | 01 | | | CAL | EA+1 |
| | | DS | | | | | | | | 00 | | | | AD | EA |
| EA 000012H | WDL | AF | DL+1 | | RLT | DH | | | | | | | | CAL | EA |
| | | AS | | | | | | | | | | | | PC | PC+1 |
| PC+2 | NEXT OP | OF | | | | | | | | | | | | CAL | PC+2 |
| | | OS | | | | | | | | | | | | | |

IF A=0, GOTO CYCLE A

SYSTEM INCLUDING CENTRAL PROCESSING UNIT

BACKGROUND OF THE INVENTION

The present invention generally relates to a central processing unit, and more particularly to a central processing unit which processes a predetermined number of bits which is different from the number of bits stored, during one machine cycle, in a memory coupled to the central processing unit via a bus. Further, the present invention is concerned with a system using the above-mentioned central processing unit.

A central processing unit is used together with memories, such as a read only memory and a random access memory, which are coupled to the central processing unit via a bus. In some systems, the number of bits processed by the central processing unit is different from that processed by the memories during one machine cycle. For example, the central processing unit processes 8 bits of data, and each memory stores data for every 16 bits. In this case, data is read out from or written into each memory for every 8 bits.

Referring to FIG. 1, there is illustrated a procedure for executing an addition operation in a system where a central processing unit (hereinafter simply referred to as a CPU) processes data for every 8 bits and a memory stores data for every 16 bits. During cycle 1, an operation code is fetched. A data bus which mutually connects the CPU and the memory carries data for every 8 bits. Thus, during cycle 2, 8-bit low-order data (hereinafter simply referred to as an L data) of 16-bit data to be subjected to the addition operation is read out from the memory and transferred to the CPU via the bus. During cycle 3, 8-bit high-order data (hereinafter simply referred to as an H data) of the 16-bit data is read out from the memory and transferred to the CPU via the bus. Cycle 3 also has a procedure for adding a binary value of 1 to the L data. During cycle 4, the addition result obtained during cycle 3 is written into the memory, and a carry signal indicative of a carry generated in the addition result is added to the H data. During cycle 5 the H data is written into the memory.

However, the above-mentioned prior art has the following disadvantage. Even if the carry is equal to 0 during cycle 4, that is, even if no carry is generated by the operation on the L data, zero is added to the H data, which is then written into the memory during cycle 5. That is, the same data as data read out from the memory during cycle 3 is written into the memory during cycle 5. As a result, cycle 5 is wasteful and thus it takes a long time to complete the operation and obtain the operation result.

In an increment operation (instruction), a carry is generated once for every 256 cycles. Thus, the remaining 255 cycles are wasteful.

SUMMARY OF THE INVENTION

It is a general object of the present invention to provide an improved central processing unit in which the above-mentioned problem is eliminated.

A more specific object of the present invention is to provide a central processing unit which operates at an increased operation speed.

The above-mentioned objects of the present invention are achieved by a central processing unit coupled to a bus which carries m (m is an integer) bits less than n (n is an integer) bits processed by the central processing unit during one machine cycle, a memory being coupled to the bus, the central processing unit comprising:

a programmable logic array;

timing control means, coupled to the programmable logic array, for generating a timing signal which defines a machine cycle of the central processing unit on the basis of an output signal from the programmable logic array and a carry signal;

predecoder means, coupled to the programmable logic array, for predecoding an operation code and outputting a predecoded operation code, the programmable logic array being accessed by a combination of the timing signal and the predecoded operation code;

data input/output means, coupled to the predecoder means and controlled by the output signal of the program logic array, for inputting data supplied from the memory via the bus for every m bits and for outputting data to the memory via the bus for every m bits; and processing means, controlled by the output signal of the programmable logic array, for carrying out a predetermined operation on m-bit low-order data from among data which is composed of n bits and which is read out from the memory by the data input/output means and for carrying out the predetermined operation on m-bit high-order data from among the data composed of n bits and outputting the carry signal when the predetermined operation on the m-bit low-order data results in a carry, the predetermined operation being specified by the predecoded operation code, wherein when the operation code is a read modify write instruction and when the processing means outputs the carry signal, the programmable logic array controls the input/output means so that only the result of the predetermined operation on the m-bit low-order data is written into the memory and a specific machine cycle during which the result of the predetermined operation on the m-bit high-order data is written into the memory is omitted.

The above-mentioned objects of the present invention are also achieved by a central processing unit coupled to a bus which carries m (m is an integer) bits less than n (n is an integer) bits processed by the central processing unit during one machine cycle, a memory being coupled to the bus, the central processing unit comprising:

a programmable logic array;

timing control means, coupled to the programmable logic array, for generating a timing signal which defines a machine cycle of the central processing unit on the basis of an output signal from the programmable logic array and a borrow signal;

predecoder means, coupled to the programmable logic array, for predecoding an operation code and outputting a predecoded operation code, the programmable logic array being accessed by a combination of the timing signal and the predecoded operation code;

data input/output means, coupled to the predecoder means and controlled by the output signal of the program logic array, for inputting data supplied from the memory via the bus for every m bits and for outputting data to the memory via the bus for every m bits; and processing means, controlled by the output signal of the programmable logic array, for carrying out a predetermined operation on m-bit low-order data from among data which is composed of n bits and which is read out from the memory by the data input/output means and for carrying out the predetermined operation on m-bit high-order data from among the data composed of n bits and outputting the borrow signal when the predetermined operation on the m-bit low-order data results in a borrow, the predetermined operation being specified by the predecoded operation code, wherein when the operation code is a read modify write instruction and when the processing means outputs the borrow signal, the programmable logic array controls the input/output means so that only a result of the predetermined operation on the m-bit low-order data is written into the memory and a specific machine cycle during which a result of the predetermined operation on the m-bit high-order data is written into the memory is omitted.

Another object of the present invention is to provide a system using the above-mentioned central processing unit.

This object of the present invention is achieved by a system comprising:

a central processing unit;

a read only memory having programs which control an operation of the central processing unit;

a random access memory; and a bus which mutually couples the central processing unit, the read only memory and the random access memory and which carries m (m is an integer) bits less than n (n is an integer) bits processed by the central processing unit during one machine cycle. The central processing unit has the aforementioned configuration.

BRIEF DESCRIPTION OF THE DRAWINGS

Other objects, features and advantages of the present invention will become more apparent from the following detailed description when read in conjunction with the accompanying drawings, in which:

FIG. 3 is a diagram illustrating a format of an instruction;

FIG. 4 is a diagram illustrating a read modify write procedure;

FIG. 9 is a diagram illustrating the operation shown in FIG. 6;

FIG. 10 is a diagram illustrating the operation shown in FIG. 7; and

DESCRIPTION OF THE PREFERRED EMBODIMENTS

Figure 1:
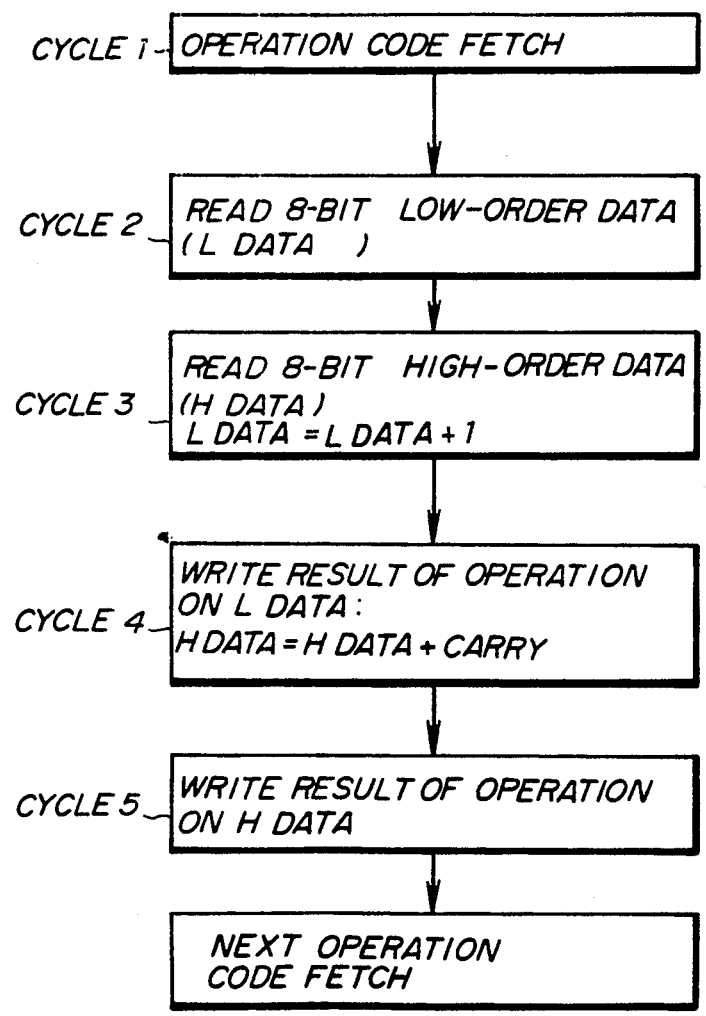
FIG. 1 is a flowchart illustrating a procedure for an addition operation executed in a system having a conventional central processing unit.
Figure 2:
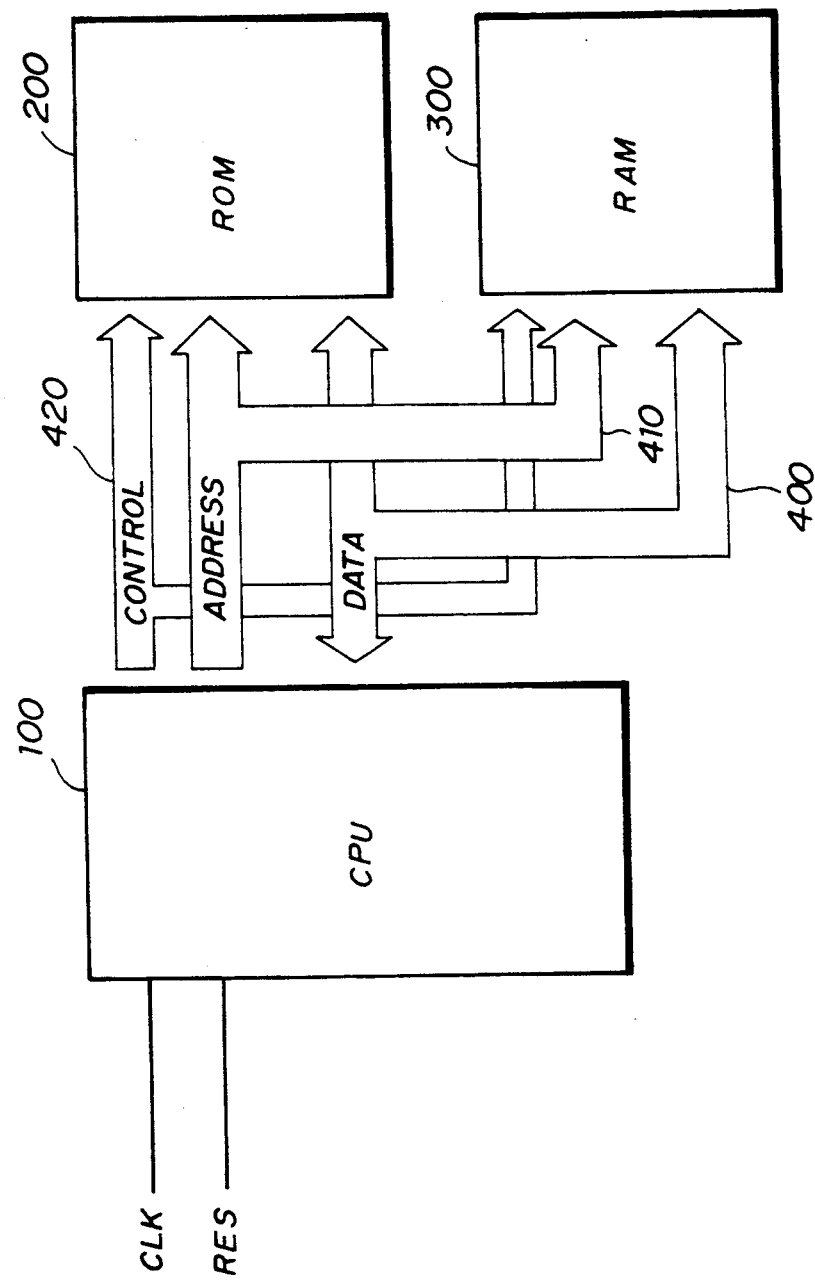
FIG. 2 is a block diagram of a system having a central processing unit according to the present invention.

Referring to FIG. 2, there is illustrated a system having a central processing unit according to a preferred embodiment of the present invention. The system shown in FIG. 2 is composed of a central processing unit (CPU) 100, a read only memory (hereinafter simply referred to as a ROM) 200 and a random access memory (hereinafter simply referred to as a RAM) 300. These devices are mutually coupled through an address bus 400, a data bus 410 and a control bus 420. A clock signal CLK and a reset signal are sent to the CPU 100 from an external device (not shown).

FIG. 3 illustrates a format of an instruction, such as an increment operation or a decrement operation. The instruction format shown in FIG. 3 is related to a so-called read modify write operation and is composed of an operation code of two bytes and an operand of one byte, for example. The operation code contains an operand of, for example, eight bits. As is well known, according to the read modify write operation, data is read out from a storage area and processed, and the processed data is then written into the same storage area.

FIG. 4 illustrates one cycle of the execution of an operation code. Basically, the execution of one operation is completed with six machine cycles. An operation code and an operand are inputted and analyzed (decoded) during the first two machine cycles. The L data and H data are read out from, for example, the RAM 300 during the second two machine cycles. The L data and H data are written into, for example, the RAM 300 during the last two machine cycles. As will be described in detail later, when the H data read out during the fourth machine cycle is the same as that which is to be written during the sixth (last) machine cycle, this sixth (last) machine cycle can be omitted, and the next operation code can be input and analyzed. This procedure is an essential feature of the present invention.

Figure 5:
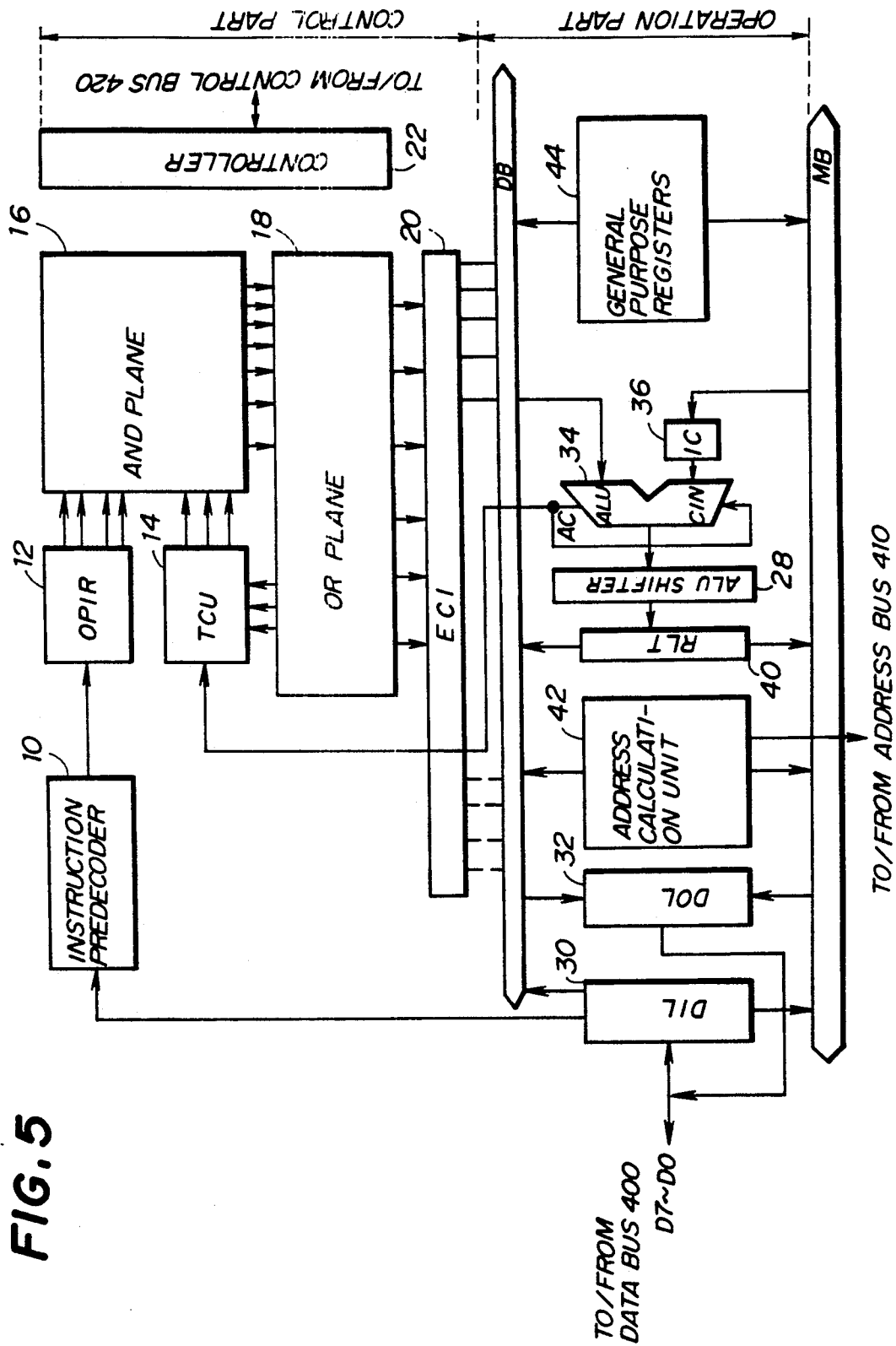
FIG. 5 is a block diagram of a central processing unit according to a preferred embodiment of the present invention.

FIG. 5 is a block diagram of the CPU 100 shown in FIG. 2. The CPU 100 is composed of a control part and an operation part. The control part is made up of an instruction predecoder 10, an operation code instruction register 12, a timing control unit 14, an AND plane 16, an OR plane 18, an execution control interface (hereinafter simply referred to as an ECI) 20 and a controller 22. The operation part of the CPU 100 is made up of a data input latch register (DIL) 30, a data output latch register (hereinafter simply referred to as a DOL) 32, an arithmetic logic unit (ALU) 34, an incrementer (IC) 36, an ALU shifter 28, a register (RLT) 40, an address calculation unit 42 and a group of general use registers 44.

The instruction predecoder 10 predecodes an operation (instruction) code which is sent from the data input register 30. For example, the instruction predecoder 10 discriminates an undefined operation code from defined operation codes. The predecoded result (operation code) is input to the AND plane 16 through the operation code register 12. The AND plane 16 and the OR plane 18 form a programmable logic array (decoder), and define all operation procedures. The timing control unit 14 defines 16 machine cycles O-F, each cycle being further divided into F(first) and S(second). The AND plane 16 is addressed by the combination of the operation code from the operation code instruction register 12 and a timing signal generated and output by the timing control unit 14. The timing control unit 14 is controlled by an output signal of the OR plane 18 and a carry signal AC supplied from the ALU 34 via a carry output terminal thereof. The output signal of the OR plane 18 is also supplied to the operation part via the ECI 20, which interfaces with the operation part. The controller 22 includes various controllers, which receive interrupt signals via the control bus 420 and which generate read/write clock signals and transfer these signals to the control bus 420.

The data input register 30 receives 8-bit data from the data bus 400 (FIG. 2) and temporarily stores the same. Then, the data input register 30 outputs the data to the instruction predecoder 10, an internal bus DB or an internal bus MB. The data output register 32 receives data to be output from the internal bus DB or MB and temporarily stores the same. Then, the data output buffer 32 outputs the data to the data bus 400 (FIG. 2). The ALU 34 receives data from the internal bus DB and a binary value of 1 from the incrementer 36 and executes predetermined operations including AND, OR, EXOR (exclusive-OR) and SUM. When a carry is generated, it is sent, as the carry signal AC, to the timing control unit 14. The operation result is input to the ALU shifter 38 and then to register 40. The group of general purpose registers 44 provides data which is to be used for a data operation or data transfer, and temporarily stores the results of the data operation or data transfer. The address calculation unit 42 has a program counter (not shown) and calculates an address, which is sent to the ROM 200 or the RAM 300 via the address bus 410.

Figure 6:
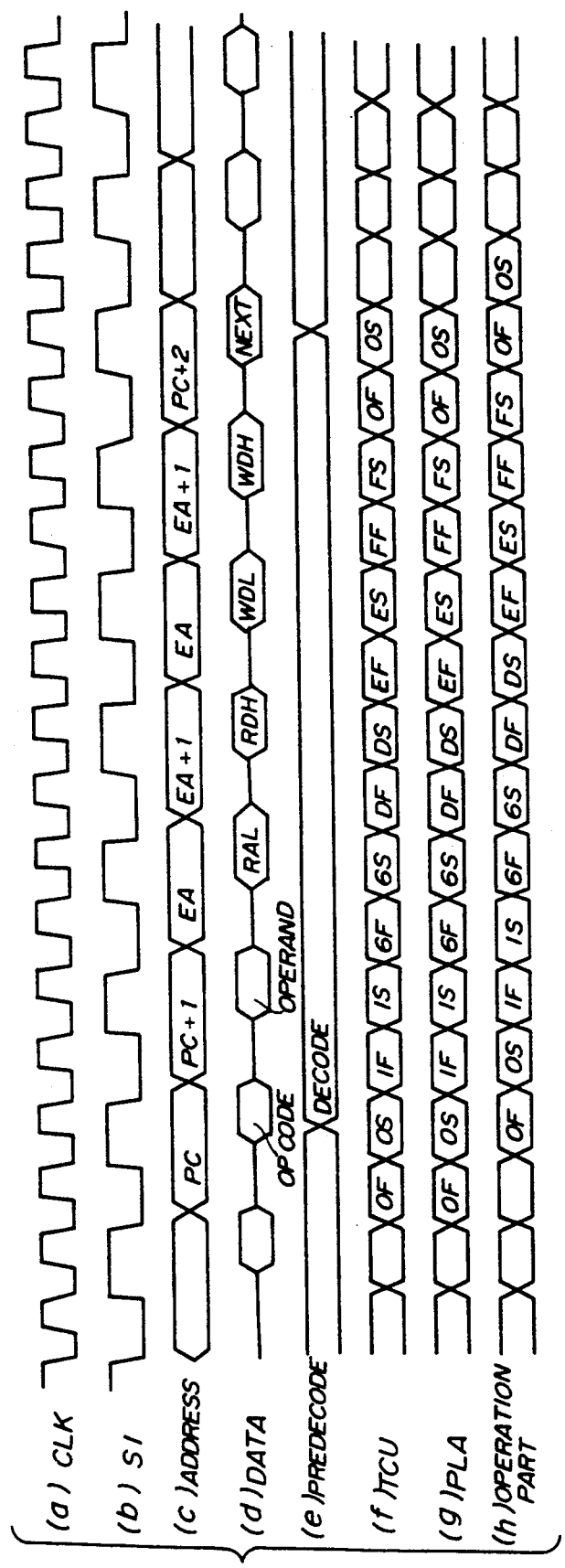
FIGS. 6 and 7 are timing charts illustrating the operation of the CPU shown in FIG. 5.
Figure 7:
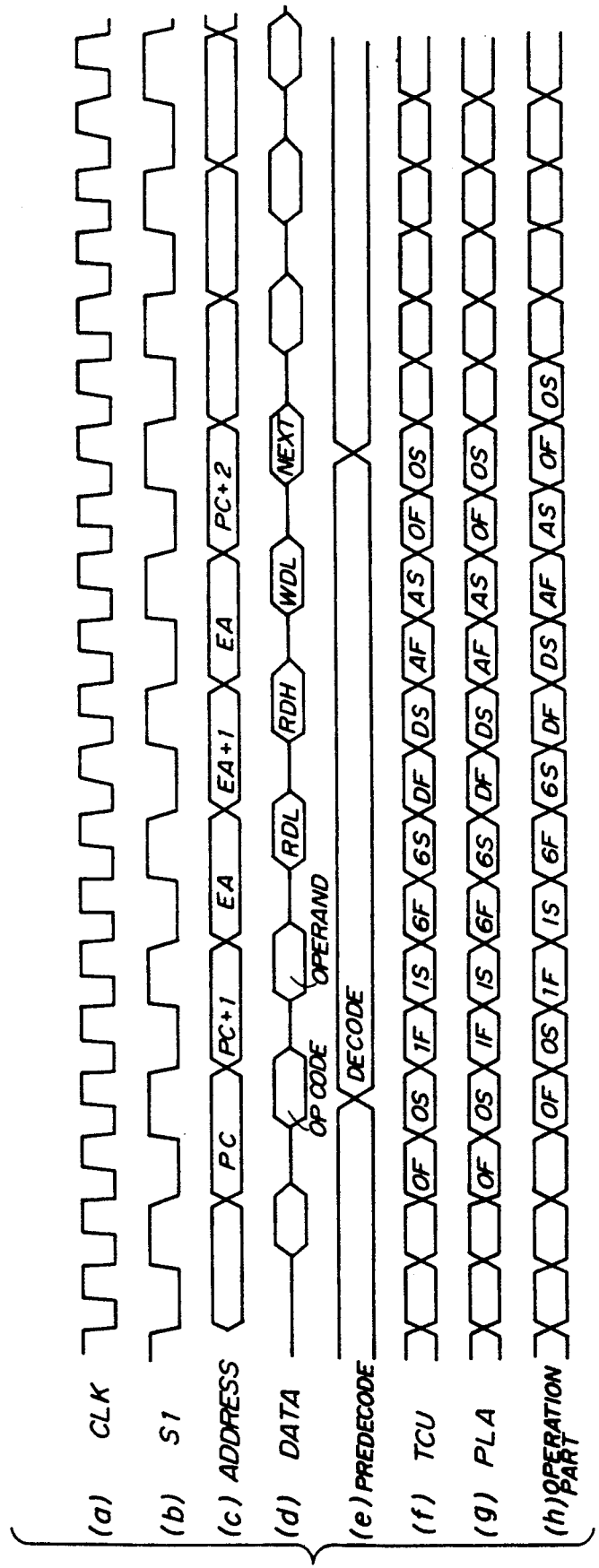

A description will now be given of the operation of the CPU shown in FIG. 5 with reference to FIGS. 6 and 7. FIG. 6 is related to a read modify write operation which has a machine cycle for writing 8-bit H data. FIG. 7 is related to an improved read modify write operation which has no machine cycle for writing 8-bit H data. The symbols shown in FIGS. 6 and 7 are defined as follows:

PC: program counter value
OP code: an operation code indicative of an increment operation
Operand: operand 12H (in the hexadecimal notification) for the increment operation
RDL: read L data (read 8-bit data from a storage area of the RAM 300 identified by address 000012H, for example)
RDH: read H data (read 8-bit data from a storage area of the RAM 300 identified by address 000013H, for example)
WDL: write L data (write 8-bit data into the storage area identified by address 000012H)
WDH: write H data (write 8-bit data into the storage area identified by address 000013H)
EA: effective address (000012H)
OS-FS, OF-FF: 16 cycles, O-F, of the timing control unit 14; each of the cycles is divided into F(First) and S(second).

The clock signal CLK (FIG. 6-(a)) is applied to the controller 22 of the CPU 100, which generates a system clock Sl (FIG. 6-(b)) having a frequency twice that of the clock signal CLK. During cycle OF of the timing control unit 14, the operation code of the increment operation is latched in the input data register 30. No procedure is carried out during cycle OS. During cycle IF, the following procedures are executed. Data (8-bit low-order data) in the input data register 30 is output to the internal bus DB and is then written into an 8-bit low-order effective address register (ADL) provided in the address calculation unit 42. Address OOH is output to the internal bus MB and written into an 8-bit intermediate-order effective address register (MDH) provided in the address calculation unit 42. Address OOH is set in an 8-bit high-order effective register (TR) in the address calculation unit 42. An effective address EA (000012H) is output to the address bus 410. Then, the cycle of the timing control unit 14 is jumped to the cycle 6F. During cycle 1S, no procedure is carried out.

During cycle 6F of the timing control unit 14, the effective address is incremented by +1 in the address calculation unit 42, and an incremented effective address is output to the address bus 410. Then the timing control unit 14 is set to cycle D. During cycle 6S, the data in the input data register 30 is output to the internal bus DB and the incrementer 36 is set to 01. Then the ALU 34 adds the data supplied from the internal bus DB and 01 generated and output by the incrementer 36. That is, the data read out from the data input register 30 is incremented by +1.

During cycle DF subsequent to cycle 6S, the effective address EA is output as it is. The write cycle starts from this cycle DF. The operation result stored in the register 40 supplied from the ALD 34 via the ALU shift register 38 is output to the internal bus MB, and is then written into the data output buffer 32. This data is the processed 8-bit low-order effective address. During cycle DS, data in the data input register 30 is output to the internal bus DB. The incrementer 36 is set to 00. The carry signal AC generated by the previous ALU operation is input to a carry-in terminal of the ALU 34 and added to the least significant bit of the H data. The ALU 34 adds the data from the internal bus DB and the data from the incrementer 36.

During cycle EF subsequent to cycle DS, the address calculation unit 42 increments the effective address EA by +1 and outputs the incremented effective address to the address bus 410. During subsequent cycle ES, no procedure is carried out.

During cycle FF subsequent to cycle ES, the calculation result in the register 40 is output to the internal bus MB, and is then written into the data output register 32. The count value of the program counter is output. Then, the cycle of the timing control unit 14 returns to the zeroth cycle OF, during which cycle the next operation code is fetched.

If no carry is generated during the aforementioned cycle DS, the timing control unit 14 is informed of this result by the carry signal AC. Thereby, the cycle of the timing control unit 14 is changed to cycle A in place of the aforementioned cycle EF. During cycle AF, the operation result in the register 40 is output to the internal bus MB. On the other hand, the timing control unit 14 is set to the zeroth cycle OF. During cycle AS, no procedure is carried out. During cycle OF, the next operation code is fetched. In this manner, as shown in FIG. 7, the writing of H data is omitted so that the operation is rapidly carried out, as compared with the operation shown in FIG. 6.

Figure 8:
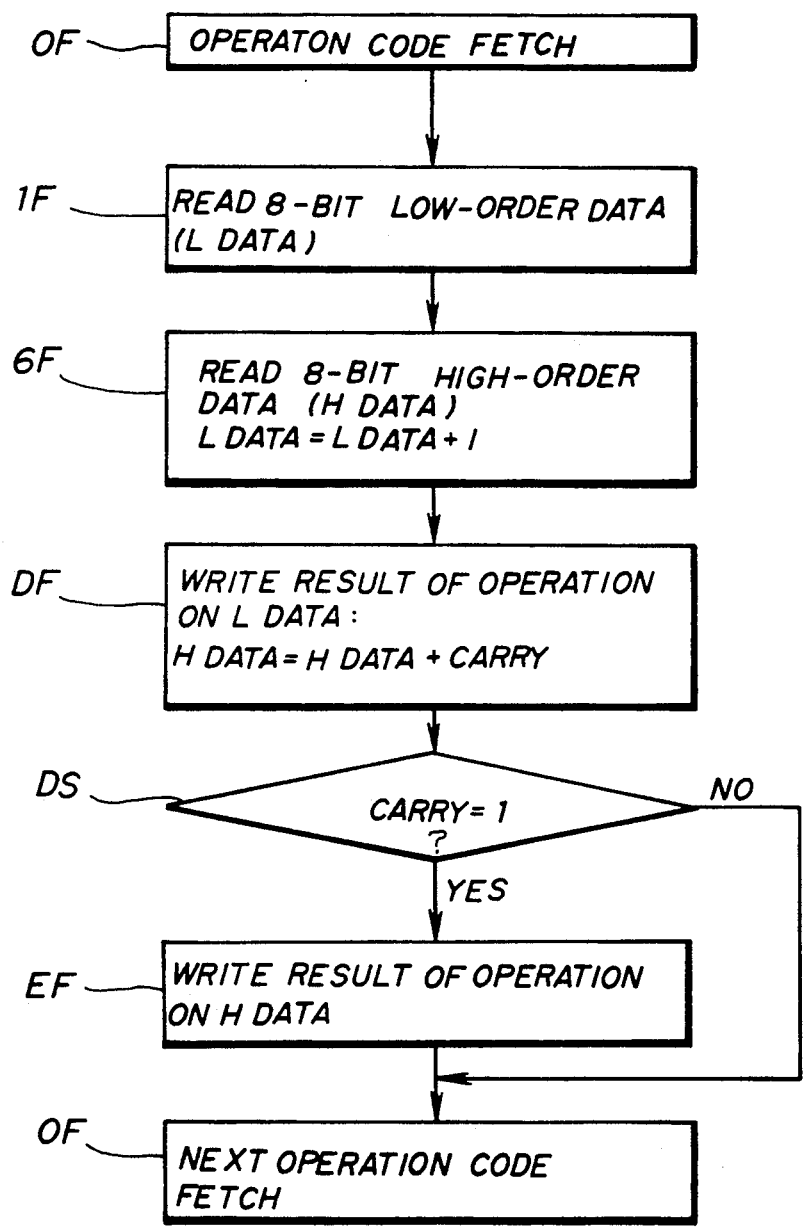
FIG. 8 is a flowchart illustrating the operation of the CPU shown in FIG. 5.

FIG. 8 is a flowchart showing the operation shown in FIGS. 6 and 7. During the aforementioned cycle DS, the timing control unit 14 receives the carry signal AC and determines that a carry of 1 is generated. In actuality, the timing control unit 14 is programmed in accordance with the value of the carry signal. In the aforementioned operation, when the carry is generated, the timing control unit 14 proceeds to cycle EF from cycle DS. On the other hand, when no carry is generated, the timing control unit 14 jumps to cycle AF.

FIG. 9 is a diagram illustrating the operation shown in FIG. 6, and FIG. 10 is a diagram illustrating the operation shown in FIG. 7. In FIGS. 9 and 10, a reference AB denotes an internal bus which is provided in the address calculation unit 42 and mutually connects the aforementioned registers ADL and ADH (the register TD is connected between the internal buses DB and MB).

When a decrement operation is input, the aforementioned CPU 100 operates in a way similar to that in the increment operation. In this case, when L data is calculated and no borrow signal is generated by the ALU 34, the writing of H data is omitted, that is, only processed L data is written in the same storage area of the RAM 300.

In the aforementioned embodiment, the data bus 400 and the address bus 410 are of the 8-bit type, and the CPU 100 is of the 16-bit type. However, the present invention is not limited to this configuration. For example, the present invention includes an arrangement in which the data bus 400 and the address bus 410 are of a 16-bit type, and the CPU 100 is of a 32-bit type.

Figure 11:
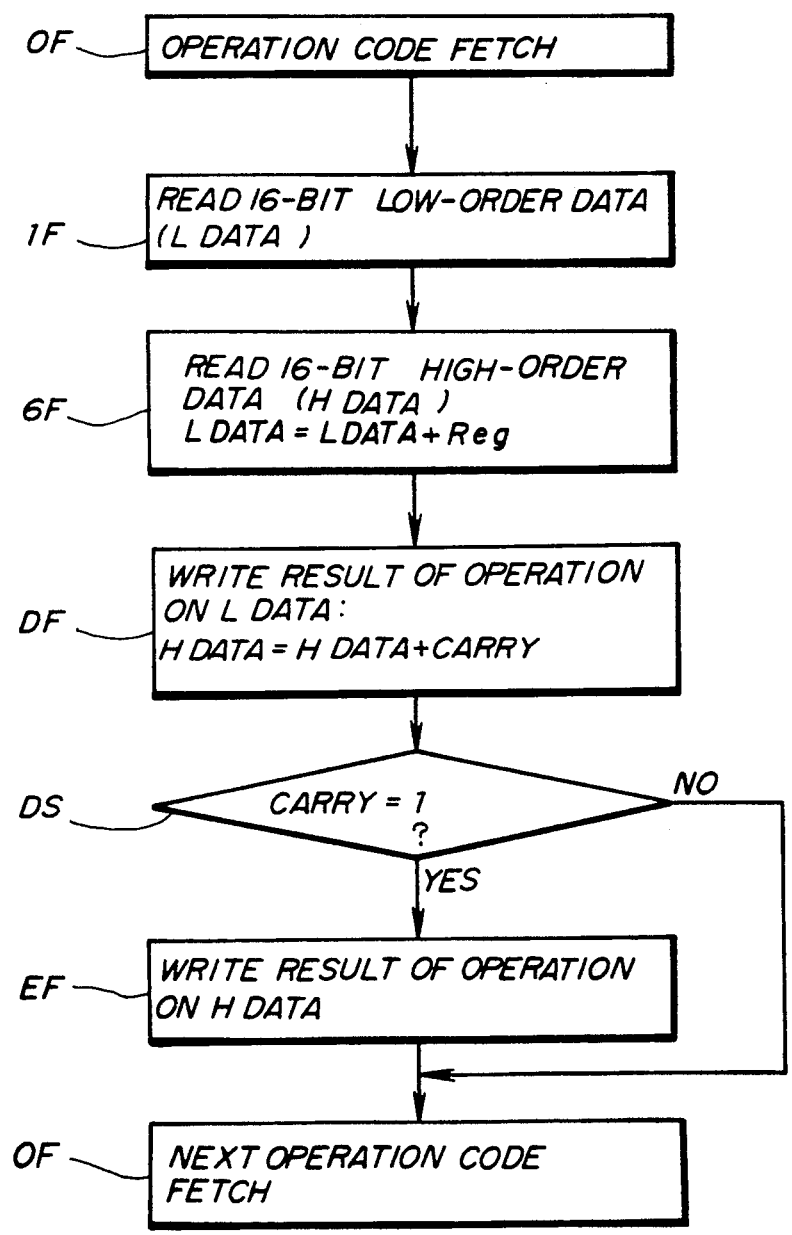
FIG. 11 is a diagram illustrating the operation of a second preferred embodiment of the present invention.

FIG. 11 is a flowchart illustrating the operation of a system having such an above arrangement. During cycle OF, an operation code is fetched. During cycle IF, 16-bit low-order (L) data is read out from the RAM 300. During cycle 6F, 16-bit high-order (H) data is read out from the RAM 300, and the L data is added to a 16-bit register data Reg. The operation result of the L data is written into the RAM 300. In this case, a carry may be generated. During cycle DS, it is determined that a carry of 1 is generated. When the result is YES, the H data is written into the RAM 300. On the other hand, when the result is NO, cycle EF is omitted.

The present invention is not limited to the specifically disclosed embodiments, and variations and modifications may be made without departing from the scope of the present invention.

What is claimed is:

1. A system comprising:
   a central processing unit having data processing means for processing data having a first data length, said data being composed of low-order data and high-order data and for processing said low-order data during a first machine cycle and said high-order data during a second machine cycle subsequent to said first machine cycle;
   a memory storing data;
   a data bus coupled to said central processing unit and said memory, said data bus having a second data length which is less than said first data length; and
   an address bus coupled to said central processing unit and said memory;
   said central processing unit comprising:
   read/write means for writing data into said memory via said data bus in accordance with an address and for reading out data from said memory via said data bus in accordance with another address;
   determining means for determining whether or not it is necessary to process the high-order data of the data being considered during said second machine cycle on the basis of a result obtained by processing the low-order data of said data being considered during said first machine cycle; and
   control means for making said data processing means immediately process the low-order data of the data subsequent to said data being considered without writing the high-order data of said data being considered into the memory when said determining means determines that it is unnecessary to process the high-order data of said data being considered;
   wherein said determining means comprises means for determining whether or not said result obtained by processing the low-order data of said data being considered has a carry, wherein said control means causes said data processing means to immediately process the low-order data of data subsequent to said data being considered without processing the high-order data of said data being considered when said determining means determines that said result has the carry.

2. A system comprising:
   a central processing unit having data processing means for processing data having a first data length, said data being composed of low-order data and high-order data and for processing said low-order data during a first machine cycle and said high-order data during a second machine cycle subsequent to said first machine cycle;
   a memory storing data;
   a data bus coupled to said central processing unit and said memory, said data bus having a second data length which is less than said first data length; and
   an address bus coupled to said central processing unit and said memory;
   said central processing unit comprising:
   read/write means for writing data into said memory via said data bus in accordance with an address and for reading out data from said memory via said data bus in accordance with another address;
   determining means for determining whether or not it is necessary to process the high-order data of the data being considered during said second machine cycle on the basis of a result obtained by processing the low-order data of said data being considered during said first machine cycle; and
   control means for making said data processing means immediately process the low-order data of the data subsequent to said data being considered without writing the high-order data of said data being considered into the memory when said determining means determines that it is unnecessary to process the high-order data of said data being considered;
   wherein said determining means comprises means for determining whether or not said result obtained by processing the low-order data of said data being considered has a borrow, wherein said control means makes said data processing means immediately process the low-order data of data subsequent to said data being considered without processing the high-order of said data being considered when said determining means determines that said result has the borrow.

3. A data processing method comprising the steps of:
   (a) reading data from a memory via a data bus, said data having a first data length, said data being composed of low-order data and high-order data, and said data bus having a second data length less than said first data length;
   (b) processing said low-order data of data being considered during a first machine cycle;
   (c) processing said high-order data of said data being considered during a second machine cycle;
   (d) determining whether or not it is necessary to process the high-order data of the data being considered during said second machine cycle on the basis of a result obtained by processing the low-order data of said data being considered during said first machine cycle; and
   (e) immediately processing the low-order data of the data subsequent to said data being considered without writing the high-order data of said data being considered when said step (d) determines that it is unnecessary to process the high-order data of said data being considered;

wherein said step (d) further comprises the step of determining whether or not said result obtained by processing the low-order data of said data being considered has a carry, wherein said step (e) immediately processes the low-order data of data subsequent to said data being considered without processing the high-order data of said data being considered when it is determined that said result has the carry.

4. A data processing method comprising the steps of:
(a) reading data from a memory via a data bus, said data having a first data length, said data being composed of low-order data and high-order data, and said data bus having a second data length less than said first data length;
(b) processing said low-order data of data being considered during a first machine cycle;
(c) processing said high-order data of said data being considered during a second machine cycle;
(d) determining whether or not it is necessary to process the high-order data of the data being considered during said second machine cycle on the basis of a result obtained by processing the low-order data of said data being considered during said first machine cycle; and
(e) immediately processing the low-order data of the data subsequent to said data being considered without writing the high-order data of said data being considered when said step (d) determines that it is unnecessary to process the high-order data of said data being considered;

wherein said step (d) further comprises the step of determining whether or not said result obtained by processing the low-order data of said data being considered has a borrow, wherein said step (e) immediately processes the low-order data of data subsequent to said data being considered without processing the high-order data of said data being considered when it is determined that said result has the borrow.

* * * * *